US010994315B2

(12) United States Patent
Presswood, Jr. et al.

(10) Patent No.: US 10,994,315 B2
(45) Date of Patent: May 4, 2021

(54) APPARATUS TO RECYCLE PLASTICS, ELECTRONICS, MUNITIONS OR PROPELLANTS USING A METAL REACTANT ALLOY COMPOSITION

(71) Applicants: Ronald G. Presswood, Jr., Houston, TX (US); Ian C. Bishop, Houston, TX (US)

(72) Inventors: Ronald G. Presswood, Jr., Houston, TX (US); Ian C. Bishop, Houston, TX (US)

( * ) Notice: Subject to any disclaimer, the term of this patent is extended or adjusted under 35 U.S.C. 154(b) by 0 days.

(21) Appl. No.: 16/588,379

(22) Filed: Sep. 30, 2019

(65) Prior Publication Data

US 2020/0030861 A1 Jan. 30, 2020

Related U.S. Application Data

(63) Continuation of application No. 15/155,987, filed on May 16, 2016, now Pat. No. 10,427,192.
(Continued)

(51) Int. Cl.
*C01B 21/02* (2006.01)
*B09B 3/00* (2006.01)
(Continued)

(52) U.S. Cl.
CPC ............ *B09B 3/0083* (2013.01); *B01D 3/007* (2013.01); *B01D 5/006* (2013.01); *B01D 5/0069* (2013.01); *B01D 19/0057* (2013.01); *B01D 21/0003* (2013.01); *B01D 21/009* (2013.01); *B01D 21/26* (2013.01); *C01B 21/02* (2013.01);
(Continued)

(58) Field of Classification Search
CPC ....... C10B 49/14; B09B 3/0083; C01B 32/05; C01B 21/02; B01D 5/006; B01D 5/0069; B01D 19/0057; B01D 21/0003; B01D 21/009; B01D 21/26; C01F 7/42;
(Continued)

(56) References Cited

U.S. PATENT DOCUMENTS 3,718,733 A 2/1973 Gehri
4,286,985 A 9/1981 Van Linden et al.
(Continued)

FOREIGN PATENT DOCUMENTS

CN 201273767 Y 7/2009
DE 19731027 C1 10/1998
(Continued)

OTHER PUBLICATIONS

Australian Office Action dated Sep. 26, 2019 for Application No. 2016263440, 4 pages.
(Continued)

*Primary Examiner* — Jonathan Miller
(74) *Attorney, Agent, or Firm* — Frost Brown Todd LLC

(57) ABSTRACT

This invention relates to a method and apparatus for recycling plastics, electronics, munitions or propellants. In particular, the method comprises reacting a feed stock with a molten aluminum or aluminum alloy bath. The apparatus includes a reaction vessel for carrying out the reaction, as well as other equipment necessary for capturing and removing the reaction products. Further, the process can be used to cogenerate electricity using the excess heat generated by the process.

20 Claims, 4 Drawing Sheets

Related U.S. Application Data

(60) Provisional application No. 62/162,648, filed on May 15, 2015.

(51) Int. Cl.

| | | |
|---|---|---|
| *F01K 7/16* | (2006.01) | |
| *F01K 23/06* | (2006.01) | |
| *B01D 19/00* | (2006.01) | |
| *B01D 21/26* | (2006.01) | |
| *B01D 21/00* | (2006.01) | |
| *B01D 5/00* | (2006.01) | |
| *B01D 3/00* | (2006.01) | |
| *C01F 7/42* | (2006.01) | |
| *C10G 1/02* | (2006.01) | |
| *H02K 7/18* | (2006.01) | |
| *C10B 49/14* | (2006.01) | |
| *C01B 32/05* | (2017.01) | |
| *C10J 3/57* | (2006.01) | |
| *F42B 33/06* | (2006.01) | |

(52) U.S. Cl.
CPC ............... *C01B 32/05* (2017.08); *C01F 7/42* (2013.01); *C10B 49/14* (2013.01); *C10G 1/02* (2013.01); *C10J 3/57* (2013.01); *F01K 7/16* (2013.01); *F01K 23/064* (2013.01); *F42B 33/06* (2013.01); *H02K 7/1823* (2013.01); *C10G 2300/1003* (2013.01); *C10J 2300/0946* (2013.01)

(58) Field of Classification Search
CPC ...... C10G 1/02; C10J 3/57; F01K 7/16; F01K 23/064; F42B 33/06; H02K 7/1823
See application file for complete search history.

(56) References Cited

U.S. PATENT DOCUMENTS

| | | | |
|---|---|---|---|
| 4,459,135 A | | 7/1984 | Glasser |
| 4,473,537 A | | 9/1984 | Ford et al. |
| 4,649,867 A | | 3/1987 | Cordier et al. |
| 5,000,101 A | * | 3/1991 | Wagner ............... F23G 5/0276 110/204 |
| 5,350,440 A | | 9/1994 | Katyal et al. |
| 5,396,580 A | | 3/1995 | Conochie et al. |
| 5,443,572 A | | 8/1995 | Wilkinson et al. |
| 5,640,708 A | | 6/1997 | Conochie |
| 5,776,420 A | | 7/1998 | Nagel |
| 5,863,314 A | | 1/1999 | Morando |
| 6,011,193 A | | 1/2000 | Myler et al. |
| 6,264,722 B1 | | 7/2001 | Kepplinger et al. |
| 6,322,745 B1 | | 11/2001 | Leigh et al. |
| 6,414,143 B1 | | 7/2002 | Cannizzo et al. |
| 7,335,320 B2 | | 2/2008 | Kindig et al. |
| 8,540,954 B2 | | 9/2013 | Olsen |
| 8,628,741 B2 | | 1/2014 | Presswood et al. |
| 9,156,017 B2 | | 10/2015 | Lee et al. |
| 9,216,905 B2 | | 12/2015 | Presswood et al. |
| 9,446,376 B2 | | 9/2016 | Lee et al. |
| 10,427,192 B2 | | 10/2019 | Presswood et al. |
| 2003/0109768 A1 | * | 6/2003 | Wagner ............... B01J 19/02 588/314 |
| 2005/0169824 A1 | | 8/2005 | Downs et al. |
| 2006/0208400 A1 | | 9/2006 | Schmeler |
| 2007/0090017 A1 | | 4/2007 | Maxwell |
| 2007/0183966 A1 | | 8/2007 | Nakagawa et al. |
| 2010/0283009 A1 | | 11/2010 | Nickels et al. |
| 2011/0171114 A1 | | 7/2011 | Shaw |
| 2012/0304822 A1 | * | 12/2012 | Presswood, Jr. ........ C01B 17/02 75/392 |
| 2013/0071306 A1 | | 3/2013 | Camp et al. |
| 2015/0152344 A1 | * | 6/2015 | Gueh ................... C10J 3/57 252/373 |
| 2016/0030987 A1 | | 2/2016 | Riedewald |

FOREIGN PATENT DOCUMENTS

| | | |
|---|---|---|
| DE | 102010010803 A1 | 9/2011 |
| GB | 284722 A | 11/1928 |
| GB | 1528655 A | 10/1978 |
| JP | S60-213353 A | 10/1985 |
| JP | H11-309335 A | 11/1999 |
| WO | WO 2008/074659 A2 | 6/2008 |
| WO | WO 2011/137113 A1 | 11/2011 |
| WO | WO 2014/032843 A1 | 3/2014 |
| WO | WO 2014/167139 A2 | 10/2014 |

OTHER PUBLICATIONS

International Search Report and Written Opinion dated Aug. 19, 2016 for International Application No. PCT/US2016/032753, 6 pages.

Extended European Search Report dated Nov. 30, 2018 for Application No. 16797110.0, 9 pages.

Notification of Transmittal of the International Preliminary Report on Patentability for PCT/US2011/033931 filed Apr. 26, 2011 (having priority date of Apr. 28, 2010) along with Written Opinion (references listed herein).

Helmensteine, Todd. "Use the Activity Series of Metal to Predict Reactivity." About.com Chemistry. About.com, 22 2010. Web Jun. 11, 2014 http://chemistry.about.com/od/chartstables/a/Activity-Series-Of-Metals.htm.

Japanese Notification of Reasons for Refusal dated Dec. 12, 2019 for Application No. 2018-511364, 6 pages.

* cited by examiner

APPARATUS TO RECYCLE PLASTICS, ELECTRONICS, MUNITIONS OR PROPELLANTS USING A METAL REACTANT ALLOY COMPOSITION

CROSS REFERENCE TO RELATED INFORMATION

This application is a continuation of U.S. patent application Ser. No. 15/155,987, filed May 16, 2016, titled Method to Recycle Plastics, Electronics, Munitions or Propellants Using a Metal Reactant Alloy Composition, now U.S. Pat. No. 10,427,192 and which claims the benefit of U.S. Provisional Patent Application No. 62/162,648, filed May 15, 2015, titled Method to Recycle Plastics, Electronics, Munitions or Propellants Using a Metal Reactant Alloy Composition the contents of which are hereby incorporated herein in its entirety.

TECHNICAL FIELD

The present invention relates to a method to recycle plastics, electronics, munitions or propellants and to capture and recover carbon, sulfur, hydrocarbons, and heavy metals from the plastics, electronics, munitions or propellants using a molten aluminum or aluminum alloy bath that may be composed of aluminum, zinc, iron, copper, silicon, and/or calcium alloys.

BACKGROUND OF THE INVENTION

Although a number of methods exist to recycle plastics, electronics, munitions or propellants, these methods are costly and in some cases create a secondary waste that can be more of a problem than the actual initial material itself. Currently, methods of recycling plastics, electronics, munitions or propellants create greenhouse gases such as carbon monoxide or carbon dioxide, as well as, other byproducts such as ammonia and other secondary compounds, which in some cases are more hazardous than the parent material. Further, these processes also produce slag, which currently must be land filled and there is currently no efficient method to recovery heavy metals, such as mercury, or rare earth metals that typically are found in electronics. While these processes work, they require significant energy input or create waste streams that must be disposed of at a cost to the operator and with potential future environmental impact.

Thus, there is a need in the art for an improved method to economically recycle plastics, electronics, munitions or propellants while recovering the remaining carbon, sulfur and any rare earth or heavy metals.

BRIEF SUMMARY OF THE INVENTION

The present invention provides an apparatus for recycling plastics, electronics, munitions or propellants. This can be any type of plastic, such as but not limited to PVC, HDPE, PF, LDPE, ABS, Nylon or other plastics. This can be any consumer electronics such as but not limited to Cell Phones, Portable Electronics Devices, Laptop Computers, Desk Top Computers, Tablets, etc. As well, this can be used to recycle any type of munition or propellant such as, but not limited to, gun power or M6. The process utilizes a molten aluminum or molten aluminum alloy bath. The aluminum can be alloyed with metals that include, but are not limited to zinc, iron, copper, silicon, and calcium. In all cases the material is ground and can be dried, and is then introduced into the bath below the surface. The ground material can be forced below the surface using an inert gas such as nitrogen or argon or fed into the bath using a gravity feed. In the process excess heat is generated and can be used to facilitate other processes such as cogeneration of power. As the ground material is passed through the bath, the aluminum or aluminum alloy bath reacts to break it down to its elemental parts. These elements are then removed from the bath using a gravimetric process and a gas capture process. The elements removed from the bath can include, but are not limited to, carbon, sulfur, hydrogen, nitrogen, mercury, copper, iron, as well as other rare earth and heavy metals. The process can also produce methane and other hydrocarbons. The elemental materials can be recovered and sold and the hydrocarbons are recovered and sold or burned to facilitate the process. The inert gas is reprocessed and reused.

The aluminum or aluminum alloy bath is able to remove oxygen compounds by chemically reacting with them at high temperature. Other compounds such as PVC are broken down as the aluminum or other alloys remove the Chloride to form Aluminum Chloride. The removal of select elements allows the bonds of the organic compounds to be broken, producing volatile organic compounds, as well as elemental compounds.

This process has been evaluated in laboratory tests using select plastics and consumer electronics. The ground plastics and consumer electronics was passed through molten aluminum. The flue gas produced and the final alloy mass was analyzed using scanning electron microscope (SEM). The review of the SEM images showed the presence of element carbon, sulfur and aluminum salts. The only items that did not break down were the S-Glass, the silicon, and silica glass.

FIG. 1 shows the basic process flow 100. In the basic process, ground material is introduced below the surface of the molten metal bath 103 using an injection feed system 101 through feed line 102. The elemental material, such as carbon, sulfur and the like, is captured 104, less dense secondary compounds are removed from the surface of bath 105, and denser secondary compounds are removed from the bottom of the bath 106. While this has been described as a method to recycle plastics, electronics, munitions or propellants, use of this method to recycle other organic compounds, such as, but not limited to rubbers, oils and tars are also contemplated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying Figures and drawings, in which.

DETAILED DESCRIPTION OF THE INVENTION

The present invention provides a process to recycle plastics, electronics, munitions or propellants. The process utilizes a molten aluminum or molten aluminum alloy bath. The process utilizes a molten aluminum bath as the reactant. The ground feedstock is introduced below the surface of the molten aluminum bath, reacts with the aluminum to decompose the feed stock. In the process, elemental carbon, sulfur, copper, iron, and rare earth and heavy metals and molecular hydrogen, nitrogen, methane, and other hydrocarbons are removed from the molten bath. The products can be sold and the nitrogen is either vented to the atmosphere or captured.

The process utilizes a molten metal as the primary reactant. In the preferred embodiments the molten metal is aluminum or an aluminum bath. The aluminum can also be alloyed with other elements including, but not limited to, zinc, iron, copper, silicon and calcium. Other metals and metal alloys such as calcium and silicon are also envisioned. The flue gas stream, which contains oxygen containing greenhouse gases produced by combustion processes, is passed through the aluminum alloy bath to remove the oxygen-containing gases from the flue gas stream.

In the process, excess heat is generated and can be used to facilitate other processes such as cogeneration of power. The excess generated by the process is a function of the makeup of the greenhouse gases in the flue gas feed.

When the feed stock contains other compounds, those compounds can also decomposed or captured. For example, if the feed stock contains inorganic compounds, such as chlorine, the process will produce an aluminum salt, in this case aluminum chloride. The present invention also provides a method and apparatus for capturing heavy metals, such as, but not limited to mercury or rare earth metals, which are often found in consumer electronics or munitions. In the process, the molten metal bath breaks down the metal compounds as they are introduced into the molten metal bath. As additional aluminum is added to the bath, the heavy metals settle to the bottom of the reaction vessels and are removed from the reaction vessel. While some aluminum may be entrained in the heavy metals that are removed from the bottom of the reaction vessel, the aluminum can be removed and refined and the heavy metals can be captured.

Figure 1:
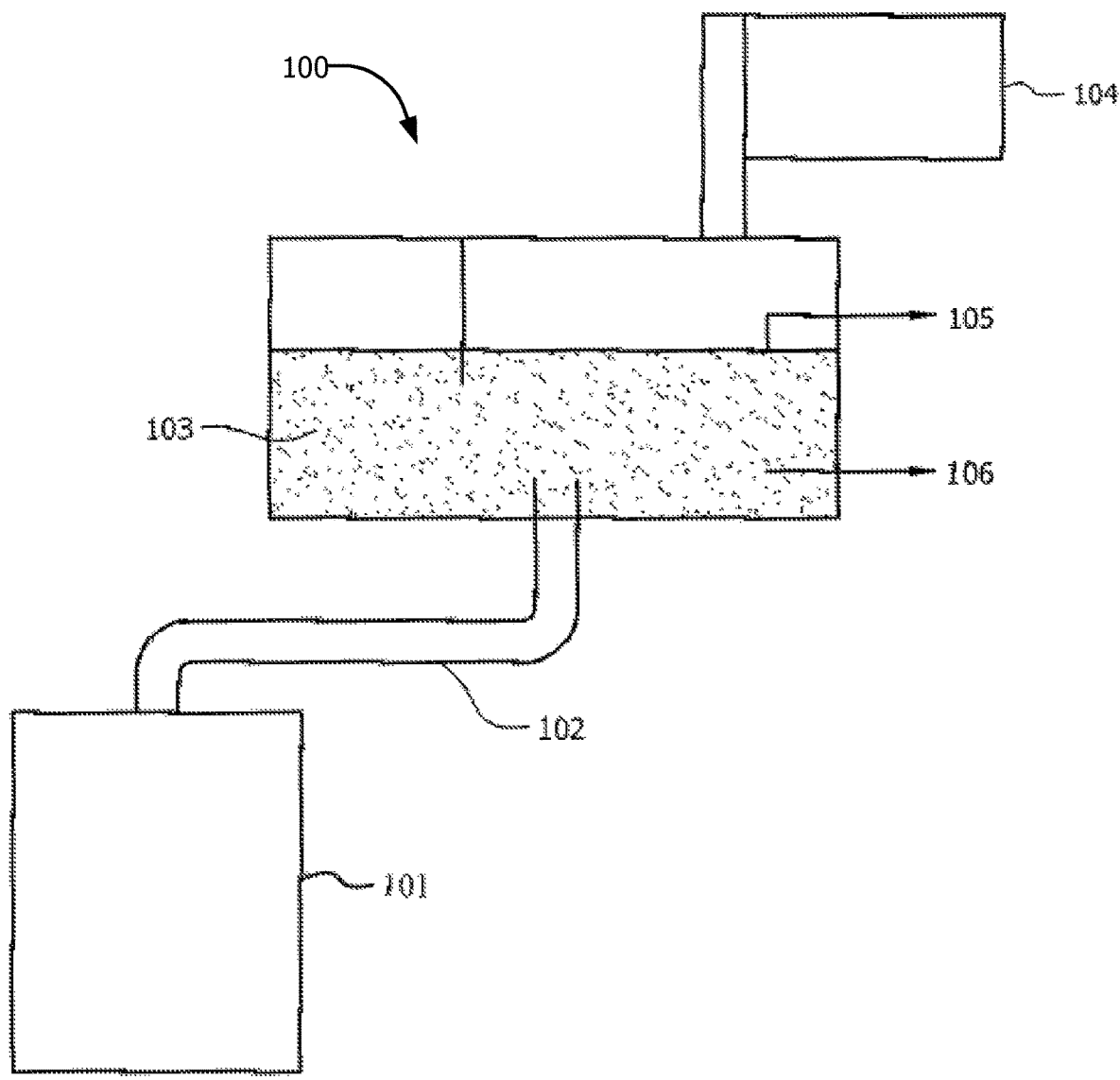
FIG. 1 shows the basic process flow.
Figure 2:
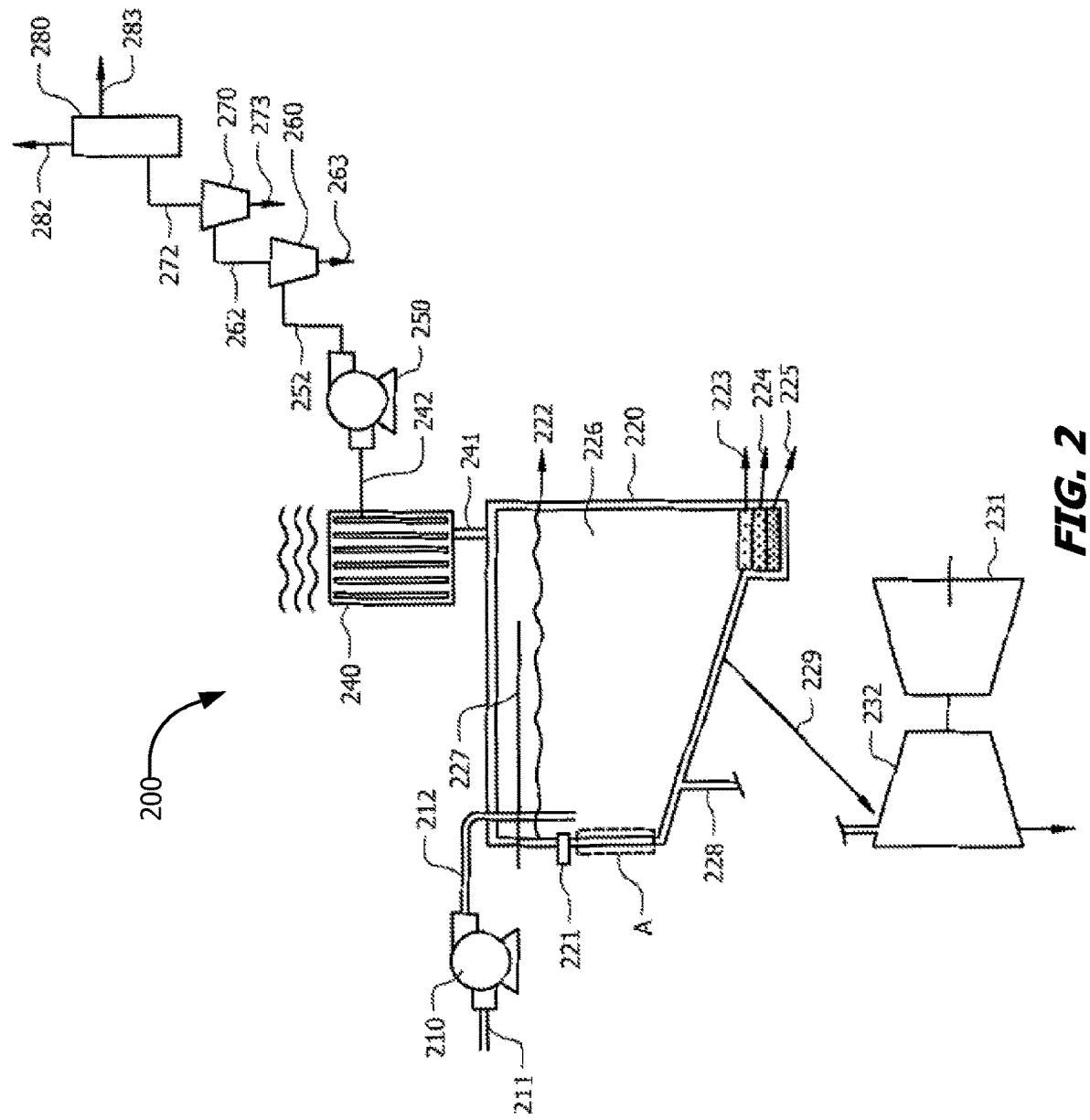
FIG. 2 shows a typical process flow.

A detailed process flow 200 is shown in FIG. 2. While the process described discusses processing recycling plastics, electronics, munitions or propellants can be processed using the invention. The ground feed stock is introduced into the treatment process through blower feed line 211. Blower 210, which may be another type of injector, is used to inject the ground feed stock into reaction vessel 220 through injection line 212. Injection line 212 introduces the ground feed stock, which is entrained in an inert gas such as nitrogen, below the surface of the molten aluminum compound 226. Injection line 212 must be sufficiently below the surface of the molten aluminum compound 226 to allow for sufficient mixing. The heavy products of the reaction, typically the heavy metals described above will settle out in the reaction vessel. The reaction vessel typically has a sloped bottom, however other designs such conical bottoms and the like can be utilized. Once the heavy products settle out, they are collected using collection lines 223, 224, and 225. Collection lines 223, 224, and 225 allow for heavy metals of different densities to be removed. Depending on the size of the process, the heavy products can be continuously removed or a batch removal process can be used.

Reaction vessel 220 also includes an aluminum feed line 221, which is used to supply additional aluminum compound to replace that consumed by the reaction with the ground feed stock. Additional heat may be required during start-up, for example. Heater 227 is provided for this purpose. Heater 227 can be any type heater, including radiative, inductive, and convective. For example, heater 227 would be a microwave heater or a radio frequency heater wherein the frequency is tuned for the metal alloy used.

Figure 3:
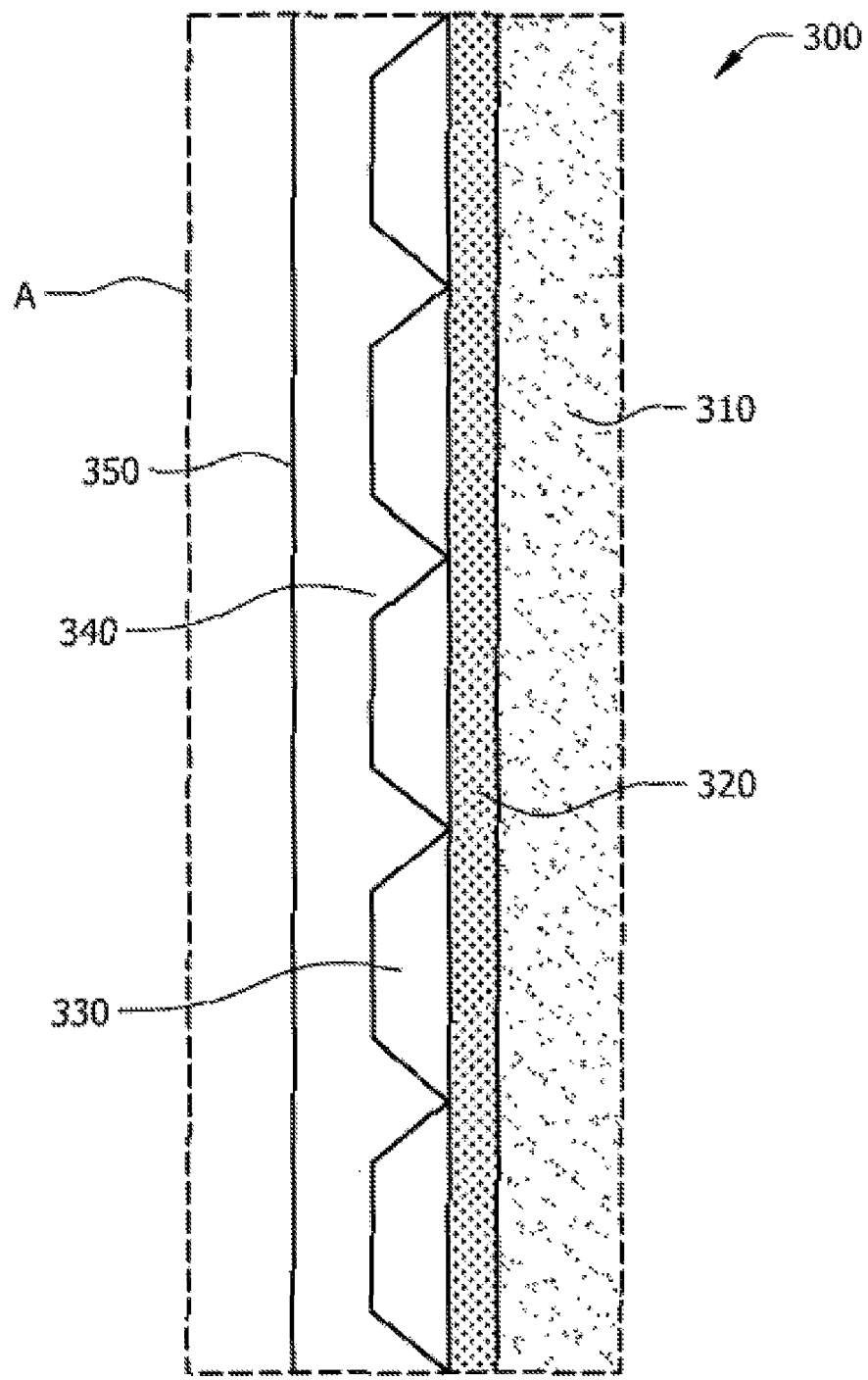
FIG. 3 shows a detailed cross sectional view of the reaction vessel wall.

Thus, the heat generated by the process must be removed. Section A, which is shown in more detail in FIG. 3 shows one way the heat can be removed from the process. The reaction vessel 220 is lined with a refractory material 310, which protects the vessel wall 320. Cooling plate 330 is attached to the vessel wall 320 and cooling water is circulated in the channels created between the cooling plant 330 and the vessel wall 320. Insulation 340 surrounds the cooling plate to maximize heat recovery, as well as for safety purposes. Once the cooling water picks up the heat generated from the process, it can be either sent to a cooling tower or the heat can be recovered and used for other purposes. If the process is used in a facility that needs a hot water source, then the heat recovery system can be designed for this purpose. However, the heat can also be used to generate electricity.

Turning back to FIG. 2, a steam turbine electric generation process is represented. In this case, the cooling water is introduced thorough cooling feed 228. As the cooling water travels around the reaction vessel 220, it picks up heat and steam is generated. The steam generated is then sent via steam line 229 to steam turbine 232. The steam passes through the turbine and as it condenses, turns the turbine blades of turbine 232. Turbine 232 is coupled to generator 231. As the turbine turns the rotor of generator 231 though the stator, it generates electricity. While this process is only briefly described, this steam turbine-electric generator process is well known in the art. And any steam turbine-electric generator process could be utilized.

Also, as described above, the reaction will also produce elemental carbon, elemental sulfur, molecular nitrogen and molecular hydrogen. These will be removed from the reaction vessel using blower 250. Blower 250 will pull high temperature elemental carbon, elemental sulfur, molecular nitrogen and molecular hydrogen from the reaction vessel 220 through heat exchanger feed line 241 into heat exchanger 240. Heat exchanger 240 will then cool this material to enable further processing. Any hydrocarbons that are produced may also be condensed in heat exchanger 240. These liquid hydrocarbons can be collected for further use or sale. Heat exchanger 240 can be any heat exchanger, however in the preferred embodiment, heat exchanger 240 is a forced air heat exchanger, however other heat exchangers, are also envisioned. The process stream then leaves the heat exchanger through line 242 and passes through blower 250 and blower discharge line 252 into two cyclone separators.

The first separator 260 separates out carbon from process stream. The carbon is collected though separation line 263. The remaining process stream proceeds to the second separator 270, which separates out sulfur from the process stream. The sulfur may be removed using a cold finger as the stream is cooled to less than 444 degrees Celsius. The sulfur is collected through separation line 273. The remaining process stream, which may include gaseous nitrogen and hydrogen, is then separated in cryo unit 280. In this unit, the gas stream is cooled further and to allow the components to be separated.

Below is a list of possible ground feed stock that may be recycled, and the resulting elemental outputs produced by the reactions within the molten metal bath.

Poly Vinyl Chloride: $2(C_2H_cCl)_n \rightarrow 4C+3H_2+2Cl$
Polypropylene: $(C_3H_6)_n \rightarrow 3C+3H_2$
PET: $(C_{10}H_8O_4)_n \rightarrow 10C+4H_2+2O_2$
Polycarbonate: $(C_{16}H_{14}O_3)_n \rightarrow 16C+7H_2+3O_2$
ABS: $(C_8H_8 * C_4H_6 * C_3H_3N)_n \rightarrow 15C+17/2H_2+1N$
4-(tert-butyl)styrene (butyl styrene):
   $(CH_3)_3C_6H_4CH=CH_2 \rightarrow 12C+8H_2$
Nylon 66: $(C_{12}H_{22}N_2O_2)_n \rightarrow 12C+11H_2+2N+2O_2$
Dibutyl Phthalate: $3C_{16}H_{22}O_4+8Al=48C+33H_2+4Al_2O_3$
Diphenylamine: $2C_{12}H_{11}N+0Al=24C+22H_2+N_2$
Nitrocellulose:
   $6C_6H_9(NO_2)O_5+12Al=36C+27H_2+3N_2+6Al_2O_3$
   $2C_6H_9(NO_2)_2O_5+12Al=12C+9H_2+N_2+6Al_2O_3$
   $6C_6H_9(NO_2)_3O_5+44Al=36C+27H_2+9N_2+22Al_2O_3$
Dinitrotoluene: $3C_7H_6N_2O_4+8Al=21C+9H_2+3N_2+4Al_2O_3$

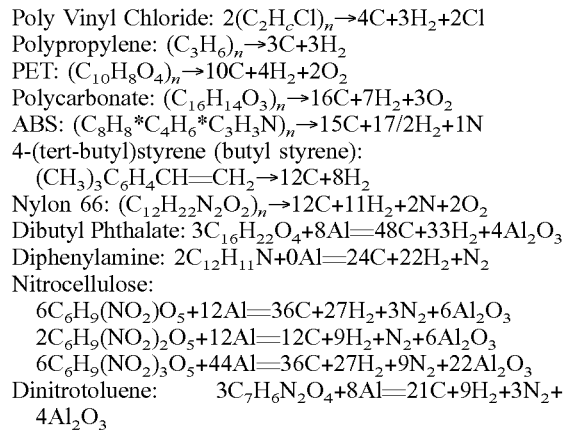

Figure 4:
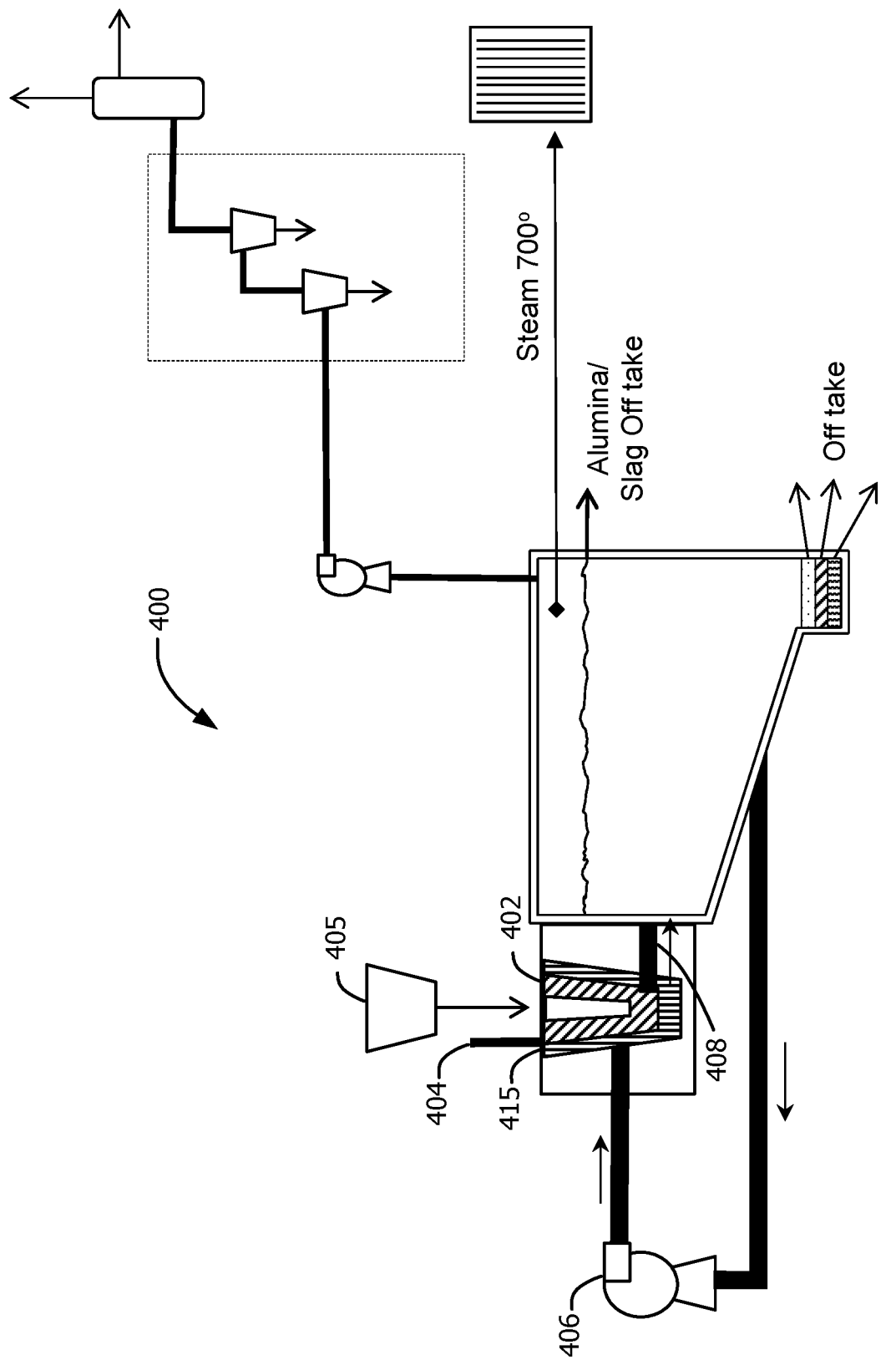
FIG. 4 shows a modified flow process incorporating a vortex.

FIG. 4 illustrates a modified process flow 400 using a vortex entry. As with the process described in FIG. 2, the modified process enables recycling of plastics, electronics, munitions or propellants. Instead of being directly injected into the aluminum bath, the ground feed stock is introduced into the treatment process through line fed by a vortex 402. The vortex 402 is formed within a ceramic bowl 415 by pumping in molten aluminum or aluminum alloy. The molten aluminum or aluminum alloy may be added through a new aluminum input line 404, or it may be recirculated from the aluminum bath using a pump 406. The ground feed stock (which may include any of the materials above that need to be recycled) may then be introduced into the ceramic bowl 415 through a gravity feed 405. The ground feed stock mixes with the molten aluminum or aluminum alloy and the mixture is pulled to the bottom of the bowl from the rotation of the vortex 402. The bottom of the ceramic bowl 415 may have a connecting line 408 to the aluminum bath, and the mixture of ground feed stock and molten aluminum or aluminum alloy enters the aluminum bath from the connecting line 408. Other aspects of the modified process flow 400 are similar to that shown with the flow in FIG. 2.

The vortex entry illustrated in FIG. 4 allows for some benefits over other injection systems. The vortex allows better mixing of the ground feed stock with the molten aluminum or aluminum alloy, which allows the recycling reactions to occur more efficiently. Additionally, because the ground feed stock has already mixed with the molten aluminum in the ceramic bowl 415, the temperature of the mixture has an opportunity to equalize, and the temperature may be relatively close to the temperature of the molten aluminum within the bath. Accordingly, there is less localized cooling, and a more consistent temperature gradient, at the entry injection point when the vortex entry is used.

As described above, once the feed stock enters the aluminum bath or the vortex, then reactions of the ground feed stock material with the aluminum or aluminum alloy bath will begin. The denser materials will begin to settle while the lighter materials will rise. The lightest materials, such as gas will bubble to the surface, to be recovered there.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for recycling plastics, electronics, munitions or propellants, the apparatus comprising:
   a bowl where a feed stock is mixed with molten aluminum;
   a reaction vessel containing further molten aluminum,
   a feed stock feed line connecting the bowl and the reaction vessel, the feed stock line feeding the feed stock and molten aluminum mixture below the surface of the molten aluminum in the reaction vessel, wherein the feed stock with the molten aluminum react in the reaction vessel, such that oxygen and oxygen containing compounds in the feed stock are removed and aluminum oxides are formed;
   collection lines connected to the reaction vessel to remove the products of the reactions;
   a cooling water feed line, the cooling water feed line circulating water around the reaction vessel to produce steam;
   a steam turbine connected to the cooling water feed line and using the steam to generate electricity.

2. The apparatus of claim 1, wherein the molten aluminum comprises an aluminum alloy selected from the group consisting of silicon, magnesium, zinc, copper, iron, and calcium.

3. The apparatus of claim 1, wherein the bowl uses a vortex of molten aluminum to receive the feed stock.

4. The apparatus of claim 1 wherein the bowl is a ceramic bowl.

5. The apparatus of claim 1 further comprising an aluminum feed line connected to the reaction vessel.

6. The apparatus of claim 1 further comprising a feed line of molten aluminum from the reaction vessel to the bowl.

7. The apparatus of claim 1 wherein slag and lighter reaction products are removed from the top of the molten aluminum in the reaction vessel.

8. The apparatus of claim 1 wherein the collection lines are connected to a low point in the reaction vessel to collect the heavier products of the reaction.

9. The apparatus of claim 1 wherein gaseous products of the reaction are captured from the top of the reaction vessel.

10. The apparatus of claim 1 further comprising a blower and a heat exchanger, the blower removing elemental materials from the top of the reaction vessel and the heat exchanger will cool the elemental materials for further processing.

11. The apparatus of claim 1 wherein the reaction vessel is formed by a vessel wall connected to a cooling plate.

12. The apparatus of claim 11 wherein a cooling liquid is circulated in channels between the vessel wall and the cooling plate.

13. The apparatus of claim 11 wherein the vessel wall is lined by a refractory material.

14. An apparatus for recycling plastics, electronics, munitions or propellants, the apparatus comprising:
 a bowl, wherein molten aluminum is fed into the bowl such that a vortex of molten aluminum is created in the bowl, further wherein a feed stock is introduced into the molten aluminum vortex in the bowl to create a molten aluminum and feed stock mixture;
 a reaction vessel containing further molten aluminum;
 a feed line between the bowl and reaction vessel such that the molten aluminum and feed stock mixture are fed from the bowl to the reaction vessel, wherein the molten aluminum and feed stock mixture enter the reaction vessel below the surface of the molten aluminum in the reaction vessel, and further wherein the feed stock mixture reacts with the molten aluminum in the reaction vessel;
 collection lines collecting heavy products produced by the reaction from in the reaction vessel;
 a blower that collect less dense compounds from the surface of the molten aluminum in the reaction vessel;
 a molten aluminum recirculation pump drawing molten aluminum from beneath the surface of the molten aluminum in the reaction vessel and adding the recirculated molten aluminum to the bowl.

15. The apparatus of claim 14, wherein the molten aluminum comprises an aluminum alloy selected from the group consisting of silicon, magnesium, zinc, copper, iron, and calcium.

16. The apparatus of claim 14 further comprising an aluminum feed line connected to the reaction vessel.

17. The apparatus of claim 14 further comprising a feed line of molten aluminum from the reaction vessel to the bowl.

18. The apparatus of claim 14 wherein the reaction vessel is formed by a vessel wall connected to a cooling plate.

19. The apparatus of claim 18 wherein a cooling liquid is circulated in channels between the vessel wall and the cooling plate.

20. The apparatus of claim 18 wherein the vessel wall is lined by a refractory material.

\* \* \* \* \*